United States Patent [19]

Dawson-Ekeland et al.

[11] Patent Number: 5,021,253

[45] Date of Patent: Jun. 4, 1991

[54] DECAFFEINATION OF LIQUID MEDIUM

[75] Inventors: Kari R. Dawson-Ekeland; Richard T. Stringfield, both of Midland, Mich.

[73] Assignee: The Dow Chemical Company, Midland, Mich.

[21] Appl. No.: 450,786

[22] Filed: Dec. 13, 1989

[51] Int. Cl.$^5$ .................................................. A23F 5/22
[52] U.S. Cl. ...................................... 426/422; 426/594
[58] Field of Search ............................................. 426/422

[56] References Cited

U.S. PATENT DOCUMENTS

| | | |
|---|---|---|
| 2,309,092 | 1/1943 | Berry et al. . |
| 3,108,876 | 10/1963 | Turken et al. . |
| 3,979,287 | 9/1976 | Vulliez-Sermet et al. . |
| 4,237,288 | 12/1980 | Rushmore . |
| 4,364,964 | 12/1982 | van der Stegen . |
| 4,382,124 | 5/1983 | Meitzner et al. . |
| 4,444,961 | 4/1984 | Timm . |
| 4,495,210 | 1/1985 | Green et al. . |
| 4,495,211 | 1/1985 | Mooiweer . |
| 4,564,644 | 1/1986 | Harris . |

FOREIGN PATENT DOCUMENTS

249274A1  5/1986  German Democratic Rep. .

*Primary Examiner*—Joseph Golian

[57] ABSTRACT

An improved method of decaffeinating and recovering such from caffeine containing materials without the use of organic solvents, except for regeneration of the resin, carbon or expensive extraction equipment, wherein the method comprises contacting an effective amount of an adsorbent resin with a liquid solution containing caffeine so as to adsorb caffeine from the liquid solution onto the adsorbent resin, where the adsorbent resin is made from a gel copolymer of a monovinyl aromatic monomer and a crosslinking monomer, where the gel copolymer has been post-crosslinked in the swollen state in the presence of a Friedel-Crafts catalyst and can be functionalized with hydrophilic groups if so desired.

33 Claims, No Drawings

DECAFFEINATION OF LIQUID MEDIUM

BACKGROUND OF THE INVENTION

The present invention relates to a method of decaffeinating liquid medium without substantial removal of desirable components contained in such medium.

In the past, there have been many methods of decaffeinating liquid medium. Decaffeination is most commonly used to remove caffeine from coffee beans, although decaffeination processes are used to remove the caffeine in teas; in chocolate or cocoa, which are derived from the cocoa bean. Typically, there are three methods of removing caffeine from a liquid medium, which include the following: decaffeination utilizing organic solvents, the Swiss extraction method, and decaffeination by utilization of a super critical extraction.

The method of decaffeinating using organic solvents, such as ethyl acetate or methylene chloride, involves mixing the organic solvent with hydrated beans or with a water extract made from hydrated beans. The caffeine is then recovered from the organic solvent. However, there are several disadvantages involved with this method. Organic solvents are very expensive and there is an inherent risk in handling large quantities of organic solvents. Additionally, consumers have a negative connotation of organic solvents being in contact with a food item. There is also the problem of removal of the organic solvents to meet the United States Federal Drug Administration regulations.

The Swiss extraction method was developed to avoid the use of organic solvents for decaffeination of coffee. It is an indirect method of removing caffeine which involves passing a water extract through a carbon bed. A carbon bed removes desirable aroma and flavor compounds as well as the caffeine. Because carbon is very abrasive and dirty to handle, the carbon bed itself is a disadvantage. Due to the abrasiveness of the carbon, equipment must be repaired and replaced frequently. Carbon does not allow for economical recovery of the caffeine.

Decaffeination by utilization of super critical extraction involves very expensive instrumentation that operates at 2,000 to 6,000 psi. The cost has been a major deterrent in the United States. The major problem with this method other than cost is that operations at such a high pressure can be a safety hazard. Additionally, the process involves high pressures so that down time due to mechanical failure has also been a problem.

In addition to the methods of decaffeination described above, there has also been an attempt to reduce caffeine by the employment of many different types of adsorbents and ion exchange resins. However, these methods still have not solved the problems of desirable flavor and aroma being removed in addition to the caffeine. In addition, the prior methods can have detrimental affects on acidity of the green bean extract. Thus, it is highly desirable to have a method of removing caffeine that is not cost prohibitive, is not abrasive on equipment, and does not remove the aroma and flavorings which consumers desire.

SUMMARY OF THE INVENTION

The present invention is an improved process for decaffeinating liquid media. The process comprises the steps of contacting the liquid solution with an effective amount of an adsorbent resin so as to adsorb the caffeine onto the adsorbent resin, where the adsorbent resin is made from a gel copolymer of a monovinyl aromatic monomer and a crosslinking monomer, where the gel copolymer has been post-crosslinked in the swollen state in the presence of a Friedel-Crafts catalyst. Preferably, the post-crosslinked gel copolymer is functionalized with hydrophilic groups.

The process provides a more effective means than was available in the past for decaffeinating liquid media without the use of organic solvents in contact with the media. Additionally, although these resins could be employed in conjunction with super critical extraction techniques, it is easier and more desirable to contact the liquid solution with the resin. These particular adsorbent resins are more desirable than the ion exchange resins that were employed in the past since these resins remove substantially more caffeine from the liquid solution Another important characteristic of the resin is that when decaffeinating coffee bean extract solutions, the adsorbent resin removes the caffeine without removing a substantial amount of the chlorogenic acid. By maintaining the chlorogenic acid in the extract the resulting coffee tastes similar to regular coffee yet it does not have the caffeine. Unlike many decaffeination processes, this decaffeination process herein is unique in that the resulting product is very aromatic, is rich in color and is very flavorful.

DETAILED DESCRIPTION

A process for decaffeinating a liquid extract solution, comprising the step of contacting the liquid extract solution with an effective amount of an adsorbent resin so as to adsorb caffeine from said liquid extract solution onto said adsorbent resin, wherein said adsorbent resin is derived from a gel copolymer of a monovinyl aromatic monomer and a crosslinking monomer, where the gel copolymer has been post-crosslinked in the swollen state in the presence of a Friedel-Crafts catalyst. The adsorbent can be functionalized with hydrophilic groups.

For purposes of describing this invention, a gel copolymer can be prepared by suspension polymerization of a monomer composition under conditions conventionally used to prepare ion exchange resins, as taught in U.S. Pat. No. 4,564,644. Although, it should be noted that there are many other polymerization techniques known in the art for preparing copolymers which could be useful in polymerization herein. Other methods of preparing gel type copolymers can be found in the book "Ion Exchange", F. Helfferich, McGraw-Hill Book Co., Inc. 1962, or U.S. Pat. No. 4,444,961.

The gel copolymer is contacted with a swelling solvent such as a haloalkylating agent, preferably bromomethyl methyl ether, chloromethyl methyl ether or a mixture of formaldehyde and hydrochloric acid, most preferably chloromethyl methyl ether, in the presence of any Friedel-Crafts catalyst. Exemplary Friedel-Crafts catalysts are acidic metal halides which include zinc chloride, ferric chloride, aluminum chloride, or stannic chloride.

Prior to post-crosslinking the copolymer with the Friedel-Crafts catalyst, the solvent from the copolymer is removed. The technique for removing the solvent is further described in East German Patent DD 249,274 A1, herein incorporated by reference. The East German Patent describes removing the solvent from macroporous copolymers of styrene and divinylbenzene, but the technique may also be employed for gel copolymers that are made from other monovinyl aromatic monomers and other crosslinking monomers as well. After haloalkylation, the copolymer is first contacted with a washing agent, such as methanol, and then the washing agent is removed by either drying the washed copolymer or extracting the washing agent with the swelling solvent used for the subsequent post-crosslinking reaction.

The washed copolymer is then post-crosslinked by swelling the washed haloalkylated copolymer beads in an inert organic liquid and contacting the copolymer with a Friedel-Crafts type catalyst. Any Friedel-Crafts catalyst will be acceptable to post-crosslink the copolymer. By the term "inert" it is meant that the organic liquid does not react with the resin beads or catalyst at the conditions employed. Suitable organic liquids which could be employed in this step would include the following: chlorinated hydrocarbons such as chlorobenzene, ethylene dichloride, methylchloride, propylene chloride, and dichlorobenzene, or nitro aromatics such as nitrobenzene. Preferably, the organic liquid is ethylene dichloride. The post-crosslinked adsorbent resin is washed with preferably organic liquids such as alcohols, more specifically methanol, ethanol, methylal and the like.

After post-crosslinking the haloalkylated copolymer, the copolymer can be functionalized with hydrophilic groups in the conventional manner, thereby producing a useful adsorbent resin. For example, the polymeric adsorbent can be functionalized by aminating a chloromethylated polymeric adsorbent with diethylamine, triethylamine, dipropylamine, tripropylamine and the like; methyl diethanol amine, triethanol amine, ethylene diamine, diethylene triamine, propylene diamine. Preferably, the polymeric adsorbent is functionalized by aminating a chloromethylated polymeric adsorbent with a dimethylamine, trimethylamine, or dimethylethanolamine, depending on whether weak base or strong base functionality is desired. Similarly, the polymeric adsorbent can be functionalized by sulfonation. Alternatively, a chloromethylated polymeric adsorbent can be functionalized by solvolysis at elevated temperatures. If it is desirable, functionalization could also be performed before post-crosslinking the copolymer. However, it should be noted that in this decaffeination process it is not necessary to use the functionalized form of the copolymer.

Most preferably, the post-crosslinked gel resin is functionalized by aminating the chloromethylated copolymer with dimethylamine or solvolysis. Using conventional ion exchange terminology, an adsorbent resin functionalized by aminating and then contacted with an acidic solution is thus converted to its acid form, which is the form desired for decaffeinating many extract solutions. Desorption of the adsorbent resin can be accomplished with an aqueous base or an organic solvent.

The preferred monovinyl aromatic monomers are styrene and its derivatives, such as α-methylstyrene and vinyl toluene; vinyl naphthalene; vinylbenzyl chloride and vinylbenzyl alcohol. Crosslinking monomers broadly encompass the polyvinylidene compounds listed in U.S. Pat. No. 4,382,124. Preferred crosslinking monomers are divinylbenzene (commercially available divinylbenzene containing less than about 45 weight percent ethylvinylbenzene), trivinylbenzene, and ethylene glycol dimethylacrylate.

The preferred gel copolymer is up to about 99.75 weight percent styrene with the balance divinylbenzene. Another preferred gel copolymer is a copolymer of about 1 to about 60 weight percent styrene, about 40 to about 99 weight percent vinylbenzyl chloride and about 1 to about 20 weight percent divinylbenzene. Additionally, one could make a gel copolymer with 99 percent vinylbenzyl chloride and 1 percent divinylbenzene. The gel copolymers may contain minor amounts of other monomers, such as the esters of acrylic and methacrylic acid, and acrylonitrile.

The crosslinking monomer serves to increase the physical stability and control the pore size distribution of the adsorbent resin. The amount of crosslinking monomer required depends significantly on the process conditions used to prepare the copolymer and can range anywhere from about 1 to about 45 percent by weight of total monomer, preferably from up to about 5 percent by weight, if a swelling solvent is not used during the polymerization. If a swelling solvent is used during polymerization the amount of crosslinking monomer can be increased.

Post-crosslinking in a swollen state displaces and rearranges polymer chains, causing an increase in the number of micropores (less than 50 Å diameter) and mesopores (less than 300 Å diameter). This increases porosity and surface area and decreases average pore size. Just as significantly, post-crosslinking also imparts rigidity to the polymer, which reduces its tendency to shrink or swell upon contact with an aqueous solution (often referred to in the ion exchange art as the "shrink/swell") and reduces its dry weight capacity when functionalized, which is an indication of its ion exchange capacity. These properties as characterized above increase the adsorptive capacity of the adsorbent resin for caffeine, decrease the adsorptive capacity for other components such as chlorogenic acid, and increase its physical and dimensional stability.

Furthermore, the reduced shrink/swell and dry weight capacity of the adsorbent resin, which post-crosslinking induces, is conducive to simple, inexpensive and efficient regeneration once caffeine is loaded onto the resin. Concentrated bases or acids are unnecessary for regeneration or cleaning. The reduced shrink/swell property allows the resin to maintain sufficient porosity to minimize entrapment of caffeine, and this property in combination with the reduced dry weight capacity reduces the tendency of the resin to retain caffeine during regeneration.

The amount of post-crosslinking required for any given application is an amount effective to achieve the adsorbent resin properties described above to the extent desired.

The adsorbent resin preferably has a surface area of about 700 to about 2100 square meters per gram of dry adsorbent resin ($m^2/g$), more preferably about 1000 to about 1800 $m^2/g$. Surface area is measured by BET nitrogen adsorption techniques. Porosity ranges from about 0.1 to about 1.2 cubic centimeters of pore volume per cubic centimeter of resin (cc/cc), preferably about 0.7 to about 1.0 cc/cc, as calculated from BET nitrogen adsorption techniques. The porosity contributed by micropores ranges from about 50 to about 100 percent, preferably about 70 to about 80 percent, depending on the resin characteristics. Percent shrink/swell ranges below about 15 percent, more preferably below about 7 percent, and most preferably below about 4 percent. Percent shrink/swell is determined by measuring the volume expansion or contraction of the adsorbent resin when subjected to hydration or a change in ionic form. The dry weight capacity, determined according to conventional methods used for characterizing ion exchange resins, ranges from greater than zero to about 4.0 milliequivalent per gram (meq/g), preferably from greater than zero to about 2.0 meq/g. If the gel copolymer is functionalized by solvolysis, for example by contact with water or an alcohol, then the dry weight capacity is essentially zero.

The adsorbent resin can be used in the form of beads, pellets or any other form desirable for decaffeinating extract solutions. If the adsorbent resin is used in the form of beads, bead size ranges from about 10 to about 1000 microns ($\mu$), preferably from about 100 to about 800 $\mu$, and more preferably from about 300 to about 800 $\mu$.

This decaffeination process can be used to remove the caffeine in teas; in chocolate or cocoa; and coffee. When employing this process one must form a liquid extract of the product that is to be decaffeinated. For chocolate and cocoa products, this can be done by forming a chocolate liquor with water. A coffee bean extract is by made increasing the moisture content of the beans from the normal 10 weight percent to above 18 percent. Typically, the beans are extracted with 3 to 4 times weight of water, based on the weight of the beans, at about 80° to about 90° C. This process could similarly be used for a cocoa bean extract.

The bean extract and adsorbent resin may be contacted using conventional methods which result in intimate contact between the resin and the extract solution. Suitable methods include fluidized beds, stirred tanks, batch tanks, and cocurrent and countercurrent flow columns. The contacting may occur batchwise, semi-batchwise, continuously or semi-continuously. Preferably, the solution is contacted with the resin continuously in a packed column.

The residence time required for contact between the adsorbent resin and the extract solution depends on the following: (1) the properties of the resin, (2) the amount of caffeine initially present, (3) the level of decaffeination desired, (4) the amount of resin used, (5) the viscosity of the extract solution, (6) the solids concentration of extract (often referred to as dissolved solids), (7) the processing temperature, and (8) the pH of the extract solution. Therefore, the residence time must be determined empirically. Preferably, the residence time ranges from about 0.1 bed volumes/hr to about 4 bed volumes/hr, more preferably about 0.2 to about 2 bed volumes/hr, and most preferably about 0.4 bed volumes/hr to about 1.0 bed volumes/hr.

Typically, the contact temperature is below about 95° C. Generally, at atmospheric pressure temperatures ranging from about 55° C. to about 70° C. are operable. However, if methanol is employed as desorbing solvent, then the upper temperature limit is about 65° C., or if ethanol is used, then the upper temperature limit is 80° C. The difference in temperatures between the two solvents is due to temperature and pressure limits recommended for handling these solvents Note—Operating under pressure would allow for increased temperature ranges.

The amount of adsorbent resin required largely depends on equipment configuration, concentration of dissolved solids, the concentration level of caffeine, and the level of decaffeination desired.

Once caffeine is loaded onto the adsorbent resin, it is desirable and preferable to desorb the caffeine from the resin using a regeneration process that takes advantage of existing equipment and process streams available to the producer. Additionally, it would be advantageous to avoid the requirement of transferring the resin from a decaffeination facility to a regeneration facility. Therefore, in the preferred process, the adsorbent resin is used in a packed column not only to decaffeinate the extract solution, but also to regenerate the resin for the next decaffeination cycle.

Desorption of caffeine is influenced by column temperature, organic solvent, water to organic solvent ratio used, and volume used. Generally if methanol is employed, then the column temperature is about 40° to about 65°; preferably about 50° to about 62° C.; most preferably 60° C. If ethanol is employed, then the column temperature is about 40° to about 75° C.; preferably about 60° to about 75° C.; most preferably about 70° C. Desorption can be accomplished using a straight solvent or a water/organic solvent mixture could be used. The weight percent organic solvent in the mixture is preferably at least about 70 weight percent, more preferably at least about 80 weight percent, most preferably at least about 85 weight percent. The volume of the water and organic solvent mixture is about 2 to about 5 bed volumes, preferably about 3 bed volumes. Caffeine is removed more quickly if the temperature and organic solvent concentration are all increased. Generally, a sufficient volume of regeneration effluent, about 3 to about 4 bed volumes, contacts the copolymer such that at least about 85 percent of the caffeine from the copolymer adsorbent is desorb, preferably about 95 percent. The adsorbent resin removes caffeine from the liquid extract without removing up to about 17 percent of the chlorogenic acid in the liquid extract solution. Additionally, the packed column of the adsorbent resin, prior to contact with the regeneration effluent, is contacted with an effective amount of water, about 5 to about 10 bed volumes. Thereafter, the packed column is backwashed to classify and expand the column and to remove particulate contaminants.

In addition to decaffeination by intimate contact between the resin and the extract solution, the use of the resin in a super critical fluid decaffeination process is possible. This could be done by contacting the caffeine loaded super critical extraction fluid with a pressurized bed of hydrated adsorption material. The temperature and pressure of the process will be determined by the selection of super critical fluid and system design.

EXAMPLES

DECAFFEINATION

Preparation of Coffee Bean Extract

To prepare 1816 g of green bean extract, 454 g of green coffee beans were placed in a container with 2270 g 90° C. water. This was then placed in a 90° C. shaker bath for 3 hours. The extract was separated from the coffee beans. 454 g of fresh green coffee beans were added to the existing extract with an additional 454 g 90° C. water. This mixture was again placed in the water bath at 90° C. for 3 hours. This process was repeated two more times. Extract prepared in this manner has 25 to 27 percent solids, 7 to 10 mg/ml caffeine and 65 to 95 mg/ml of chlorogenic acid. The mixture was used immediately or frozen until needed.

Preparation of the Adsorbent Resin

To a three-necked 2-liter flask equipped with a stirrer, reflux condenser connected to a caustic scrubber, thermometer, and a recirculating hot water heating system was charged 100 g of the chloromethylated gel copolymer and 77 g ethylene dichloride. The reactor was heated slowly to 83° C. for 2 hours. After cooling, the ferric chloride was quenched with 100 g of water. The agitation was continued for an additional hour before removing the post-crosslinked adsorbent beads. The beads were washed twice with methanol followed by two water washes before amination.

To a 2-liter parr reactor was added 400 ml of the post-crosslinked adsorbent beads 100 g 40% dimethylamine, 50 g 50% caustic and 100 g water. The reactor was sealed and heated to 90° C. for 5 hours with agitation. After cooling, the beads were removed from the reactor and the liquor was decanted. The beads were reslurried in water and acidified using concentrated hydrochloric acid. After standing for one hour, the liquor was decanted and the beads were washed with water. The resin was reslurried and enough caustic was added to make the slurry basic. After standing for another hour, the beads were backwashed with deionized water until the effluent was neutral.

Decaffeination

The test was conducted by the following procedure: 1.5 g dry weight resin with 75 mls of green coffee bean extract were combined in a flask and placed in 60° C. shaker bath for 16 hours. The resin and extract were separated and the extract was evaluated for caffeine and chlorogenic acid removal.

Evaluation of the Extract After Decaffeination

The green coffee bean extract was evaluated by high pressure liquid chromatography. The samples were injected on to an ODS column. Concentrations of the caffeine and the chlorogenic acid were calculated by comparison to standards of known concentration, see Table I and II.

Regeneration of the Resin

Regeneration of the resin in between extraction cycles was achieved by removing extract and adding 10 mls water as a rinse. The water was removed and 20 mls 90:10 methanol to water by volume was added. The extract was then placed in a shaker bath for 1 hour and then the procedure was repeated. Another water rinse was done to remove methanol prior to starting the next extraction cycle.

COMPARATIVE

Similar to the example, tests were performed for Comparative A and Comparative B. Comparative A is an adsorbent resin sold by Rohm & Haas under the trademark "Amberlite" XAD 4. This resin is a nonfunctional styrene/divinyl benzene adsorbent copolymer, where the copolymer contains greater than 40 weight percent divinylbenzene. Comparative B is a macroporous ion exchange resin sold by Diamond Shamrock under the trademark "Duolite" S761. Diamond Shamrock's resin is a sulfonated phenolformaldehyde resin.

TABLE I

Caffeine Removal During Equilibrium Study*

| | Cycle Number | | | | |
|---|---|---|---|---|---|
| | 1 | 2 | 3 | 4 | 5 |
| Caffeine Removed at Equilibrium (mg/ml) | | | | | |
| Initial Concentration | 7.02 | 6.8 | 8.53 | 9.13 | 7.02 |
| Example | 2.4 | 2.6 | 2.2 | 2.6 | 2.3 |
| Comparative A | 1.2 | 2.0 | 1.0 | 2.1 | 1.1 |
| Comparative B | 0.5 | 1.3 | 0.9 | 1.4 | 0.89 |
| Percent Caffeine Removed | | | | | |
| Example | 34 | 38.1 | 25.2 | 28.5 | 35 |
| Comparative A | 17.5 | 29.4 | 12.2 | 22.9 | 17.7 |
| Comparative B | 7.7 | 19.1 | 10.1 | 15.2 | 13.7 |

*1.5 gram (dry weight) of resin/75 ml of green coffee bean extract 16 hours contact time

TABLE II

Chlorogenic Acid Removal During Equilibrium Study

| | Cycle Number | | | | |
|---|---|---|---|---|---|
| | 1 | 2 | 3 | 4 | 5 |
| Chlorogenic Acid Removed at Equilibrium/4 mg/ml | | | | | |
| Initial Concentration | 72.3 | 75.4 | 91.3 | 93.4 | 67.4 |
| Example | 10.3 | 11.4 | 11.1 | 10.6 | 10.9 |
| Comparative A | 7.8 | 18.3 | 19.2 | 12.1 | 13.4 |
| Comparative B | 13.7 | 38.5 | 20.6 | 11.2 | 14.8 |
| Percent Chlorogenic Acid Removed | | | | | |
| Example | 14.2 | 15.2 | 12.2 | 11.4 | 16.2 |
| Comparative A | 5.3 | 24.2 | 21.1 | 12.9 | 19.9 |
| Comparative B | 18.6 | 51.2 | 10.3 | 16.8 | 21.9 |

As can be seen from the table above, the gel adsorbent resin herein removes less chlorogenic acid on a per volume basis of caffeine removed than does Comparative A or Comparative B.

What is claimed is:

1. An improved process of decaffeinating a liquid solution by contacting the liquid solution with an effective amount of an adsorbent resin so as to adsorb caffeine from the liquid solution onto the adsorbent resin, wherein the improvement comprises contacting the liquid solution containing caffeine with an adsorbent resin that is made from a gel copolymer of a monovinyl aromatic monomer and a crosslinking monomer, where the gel copolymer has been post-crosslinked in the swollen state in the presence of a Friedel-Crafts catalyst.

2. The process of claim 1 wherein the post-crosslinked gel copolymer is functionalized with hydrophilic groups.

3. The process of claim 1 wherein the crosslinking monomer is a polyvinylidene monomer.

4. The process of claim 3 wherein the polyvinylidene monomer is divinylbenzene, trivinylbenzene, or ethylene glycol diacrylate 5. The process of claim 4 wherein the monovinyl aromatic monomer is styrene or a derivative of styrene, vinyltoluene, vinylbenzyl chloride, vinylbenzyl alcohol, or vinylnaphthalene.

6. The process of claim 5 wherein the gel copolymer contains up to about 99.75 weight percent styrene with the balance divinylbenzene.

7. The process of claim 1 wherein the gel copolymer contains from about 1 to about 45 weight percent of the crosslinking monomer.

8. The process of claim 7 wherein the adsorbent resin contains from about 4 to about 8 weight percent of the crosslinking monomer.

9. The process of claim 1 wherein the gel copolymer is chloromethylated.

10. The process of claim 1 wherein the gel copolymer is post-crosslinked with a polyfunctional alkylating or acrylating compound.

11. The process of claim 2 wherein the post-crosslinked gel copolymer is functionalized with dimethylamine, trimethylamine or dimethylethanolamine.

12. The process of claim 2 wherein the post-crosslinked copolymer is functionalized by solvolysis.

13. The process of claim 2 wherein the post-crosslinked gel is functionalized by sulfonation.

14. The process of claim 1 wherein the adsorbent resin has a surface area of about 700 to about 2100 m$^2$/g.

15. The process of claim 14 wherein the adsorbent resin has a surface area of about 1000 to about 1800 m$^2$/g.

16. The process of claim 1 wherein the adsorbent resin has a porosity of about 0.10 to about 1.2 cc/cc.

17. The process of claim 16 wherein the adsorbent resin has a porosity of about 0.7 to about 0.8 cc/cc.

18. The process of claim 1 wherein the adsorbent resin exhibits a percent shrink/swell below about 7 percent.

19. The process of claim 18 wherein the adsorbent resin exhibits a percent shrink/swell below about 4 percent.

20. The process of claim 1 wherein the dry weight capacity of the adsorbent resin ranges from greater than zero to about 4.0 meq/g.

21. The process of claim 20 wherein the dry weight capacity of the adsorbent resin ranges from greater than zero to about 2.0 meq/g.

22. The process of claim 1 wherein the liquid solution is a solution of coffee bean extract.

23. The process of claim 1 wherein the liquid coffee bean extract solution is contacted with the adsorbent resin continuously in a packed column.

24. The process of claim 1 wherein the liquid solution is a chocolate extract.

25. The process of claim 1 wherein the liquid solution is a tea extract.

26. The process of claim 1 further comprising the step of desorbing caffeine from the adsorbent resin by contacting the resin with an alcohol and water mixture.

27. The process of claim 26 wherein the organic solvent in the mixture is at least about 70 weight percent.

28. The process of claim 27 wherein the organic solvent in the mixture is at least about 85 weight percent.

29. The process of claim 26 wherein a sufficient volume of regeneration effluent contacts the adsorbent resin to desorb at least about 85 percent of the caffeine from the copolymer.

30. The process of claim 29 wherein a sufficient volume of regeneration effluent contacts the adsorbent resin to desorb at least about 95 percent of the caffeine from the copolymer.

31. The process of claim 26 wherein a packed column of the adsorbent resin used for decaffeinating the liquid solution is treated prior to contact with the regeneration effluent by contacting the packed column with an effective amount of water and then backwashing the packed column to classify and expand the column and to remove particulate contaminants.

32. The process of claim 31 wherein the post-crosslinked gel copolymer is functionalized with dimethylamine, trimethylamine or dimethylethanolamine.

33. The process of claim 1 wherein the adsorbent resin removes caffeine from the liquid extract without removing up to about 17 percent of the chlorogenic acid in the liquid extract solution.

* * * * *